(12) United States Patent
Ait Aoudia et al.

(10) Patent No.: US 12,015,507 B2
(45) Date of Patent: Jun. 18, 2024

(54) TRAINING IN COMMUNICATION SYSTEMS

(71) Applicant: Nokia Technologies Oy, Espoo (FI)

(72) Inventors: Faycal Ait Aoudia, Saint-Cloud (FR); Jakob Hoydis, Paris (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/013,586

(22) PCT Filed: Jun. 29, 2020

(86) PCT No.: PCT/EP2020/068238
§ 371 (c)(1),
(2) Date: Dec. 29, 2022

(87) PCT Pub. No.: WO2022/002347
PCT Pub. Date: Jan. 6, 2022

(65) Prior Publication Data
US 2023/0246887 A1    Aug. 3, 2023

(51) Int. Cl.
*H04L 25/03* (2006.01)
*H04B 7/06* (2006.01)
(52) U.S. Cl.
CPC ..... *H04L 25/03165* (2013.01); *H04B 7/0615* (2013.01); *H04L 25/03343* (2013.01)
(58) Field of Classification Search
CPC ........ H04L 25/03165; H04L 25/03343; H04B 7/0615
See application file for complete search history.

(56) References Cited

U.S. PATENT DOCUMENTS

| | | | | |
|---|---|---|---|---|
| 2022/0303158 A1* | 9/2022 | Alesiani | ............ | H04L 25/03178 |
| 2022/0393795 A1* | 12/2022 | Goutay | ..................... | H04L 1/16 |
| 2024/0080247 A1* | 3/2024 | Ma | ........................ | H04W 72/20 |

FOREIGN PATENT DOCUMENTS

| | | |
|---|---|---|
| CN | 1399835 A | 2/2003 |
| CN | 101662442 A | 3/2010 |

(Continued)

OTHER PUBLICATIONS

Ait Aoudia F. et al., "End-to-End Learning of Communications Systems Without a Channel Model," arxiv.org, Cornell University Library, Apr. 6, 2018.

(Continued)

*Primary Examiner* — Janice N Tieu
(74) *Attorney, Agent, or Firm* — Harrington & Smith

(57) ABSTRACT

An apparatus, method and computer program is described including: receiving, at a receiver of a transmissions system, transmitted signals from each of a plurality of transmitters, wherein each transmitter communicates with the receiver over one of a plurality of channels of the transmission system, wherein each transmitter includes a transmitter algorithm having at least some trainable weights, wherein each transmitter algorithm has the same trainable weights and wherein each of the transmitted signals is based on a perturbed channel symbol generated at the respective transmitter, wherein the channel symbols and perturbations are known to the receiver; updating the weights of the transmitter algorithm, at the receiver, based on a loss function; providing the updated weights to each transmitter of the transmission system; and repeating the receiving and updating until a first condition is reached.

15 Claims, 9 Drawing Sheets

(56) References Cited

FOREIGN PATENT DOCUMENTS

| CN | 110267274 A | 9/2019 |
| CN | 110753937 A | 2/2020 |
| WO | WO 2019/080988 A1 | 5/2019 |
| WO | WO 2020/104045 A1 | 5/2020 |

OTHER PUBLICATIONS

Ait Aoudia, Faycal, et al., « End-to-End Learning of Communications Systems Without a Channel Model, 2018 $52^{nd}$ Asilomar Conference on Signals, Systems, and Computers, Feb. 21, 2018, arXiv:1804.02276v3 [cs.IT], Dec. 5, 2018, 6 pages.

* cited by examiner

TRAINING IN COMMUNICATION SYSTEMS

CROSS REFERENCE TO RELATED APPLICATION

This patent application is a U.S. National Stage application of International Patent Application Number PCT/EP2020/068238 filed Jun. 29, 2020, which is hereby incorporated by reference in its entirety.

FIELD

This specification relates to training in communication systems, such as communication systems having trainable parameters.

BACKGROUND

End-to-end communication systems comprising a transmitter, a channel and a receiver in which the transmitter and/or the receiver have trainable parameters are known. Although a number of algorithms for training such systems are known, there remains a need for further developments in this field.

SUMMARY

In a first aspect, this specification describes an apparatus comprising means configured to perform: receiving, at a receiver of a transmissions system, transmitted signals from each of a plurality of transmitters, wherein each transmitter communicates with the receiver over one of a plurality of channels of the transmission system, wherein each transmitter includes a transmitter algorithm having at least some trainable weights, wherein each transmitter algorithm has the same trainable weights and wherein each of the transmitted signals is based on a perturbed channel symbol generated at the respective transmitter, wherein the channel symbols and perturbations are known to the receiver; updating said weights of said transmitter algorithm, at the receiver, based on a loss function; providing (e.g. broadcasting) said updated weights to each transmitter of the transmission system; and repeating the receiving and updating until a first condition is reached. The apparatus may be a receiver of a communication system (e.g. a central node, such as a base station, in communication with many transmitters, such as user devices). The receiver may include a receiver algorithm having at least some trainable weights.

The loss function may be determined at the receiver based on a sum of losses for each of a plurality of symbols transmitted from the plurality of transmitters, based on the knowledge, at the receiver, of the respective channel symbols and the respective perturbations.

Example embodiments further comprise means configured to perform: training the trainable weights of the receiver algorithm (e.g. at the same time as training the weights of the transmitter algorithm).

The first condition may comprise a defined number of iterations. Other example first conditions are possible in addition to, or instead of, a defined number of iterations.

The channel symbols and/or the perturbations may be generated pseudo-randomly.

The apparatus may further comprise means configured to perform initialising said transmitter weights (e.g. to a predefined starting point or to a random (or pseudo-random) starting point).

The transmitter algorithm may be implemented using neural networks. A receiver algorithm may also be implemented using neural networks.

In a second aspect, this specification describes an apparatus comprising means configured to perform: transmitting signals from one of a plurality of transmitters of a transmission system to a receiver of the transmissions system, wherein each of the plurality of transmitters communicates with the receiver over one of a plurality of channels of the transmission system, wherein each transmitter includes a transmitter algorithm having at least some trainable weights, wherein each transmitter has the same trainable weights and wherein the transmitted signals are based on a perturbed channel symbol generated at the respective transmitter, wherein the channel symbols and perturbations are known to the receiver; and receiving updated weights of said transmitter algorithm from the receiver, wherein said weights are updated at the receiver based on a loss function. The apparatus may be one of a plurality of transmitters of a communication system (e.g. a mobile communication system).

The channel symbols and/or the perturbations may be generated pseudo-randomly.

The apparatus may further comprise means configured to perform initialising said transmitter parameters (e.g. to a predefined starting point or to a random (or pseudo-random) starting point).

The receiver may be a communication node (e.g. a base station) of a mobile communication system.

The transmitter algorithm may be implemented using neural networks. A receiver algorithm may also be implemented using neural networks.

In a third aspect, this specification describes a transmission system comprising a plurality of transmitters, a plurality of channels and a receiver, comprising means configured to perform: transmitting signals from one or more of the plurality of transmitters to the receiver, wherein each of the plurality of transmitters communicates with the receiver over one of the plurality of channels, wherein each transmitter includes a transmitter algorithm having at least some trainable weights, wherein each transmitter has the same trainable weights and wherein the transmitted signals are based on a perturbed channel symbol generated at the respective transmitter, wherein the channel symbols and perturbations are known to the receiver; receiving the transmitted signals at the receiver of the transmissions system; updating said weights of the transmitter algorithm, at the receiver, based on a loss function; providing (e.g. broadcasting) said updated weights to each transmitter of the transmission system; and repeating the receiving and updating until a first condition is reached. The transmission system may further comprise features of the first and second aspects described above.

In the first, second and third aspects described above, the said means may comprise: at least one processor; and at least one memory including computer program code, the at least one memory and the computer program configured, with the at least one processor, to cause the performance of the apparatus.

In a fourth aspect, this specification describes a method comprising: receiving, at a receiver of a transmissions system, transmitted signals from each of a plurality of transmitters, wherein each transmitter communicates with the receiver over one of a plurality of channels of the transmission system, wherein each transmitter includes a transmitter algorithm having at least some trainable weights, wherein each transmitter algorithm has the same trainable weights and wherein each of the transmitted signals is based on a perturbed channel symbol generated at the respective transmitter, wherein the channel symbols and perturbations are known to the receiver; updating said weights of said transmitter algorithm, at the receiver, based on a loss function; providing (e.g. broadcasting) said updated weights to each transmitter of the transmission system; and repeating the receiving and updating until a first condition (e.g. a defined number of iterations) is reached.

The loss function may be determined at the receiver based on a sum of losses for each of a plurality of symbols transmitted from the plurality of transmitters, based on the knowledge, at the receiver, of the respective channel symbols and the respective perturbations.

The receiver may include a receiver algorithm having at least some trainable weights. The method may further comprise training the trainable weights of the receiver algorithm (e.g. at the same time as training the weights of the transmitter algorithm).

The channel symbols and/or the perturbations may be generated pseudo-randomly.

The method may further comprise perform initialising said weights of said transmitter algorithm (e.g. to a predefined starting point or to a random (or pseudo-random) starting point).

In a fifth aspect, this specification describes a method comprising: transmitting signals from one of a plurality of transmitters of a transmission system to a receiver of the transmissions system, wherein each of the plurality of transmitters communicates with the receiver over one of a plurality of channels of the transmission system, wherein each transmitter includes a transmitter algorithm having at least some trainable weights, wherein each transmitter has the same trainable weights and wherein the transmitted signals are based on a perturbed channel symbol generated at the respective transmitter, wherein the channel symbols and perturbations are known to the receiver; and receiving updated weights of said transmitter algorithm from the receiver, wherein said weights are updated at the receiver based on a loss function.

The channel symbols and/or the perturbations may be generated pseudo-randomly.

The method may comprise initialising said weights of said transmitter algorithm (e.g. to a predefined starting point or to a random (or pseudo-random) starting point).

In a sixth aspect, this specification describes a method comprising: transmitting signals from one or more of a plurality of transmitters of a transmission system to a receiver of the transmission system, wherein each of the plurality of transmitters communicates with the receiver over one of a plurality of channels, wherein each transmitter includes a transmitter algorithm having at least some trainable weights, wherein each transmitter has the same trainable weights and wherein the transmitted signals are based on a perturbed channel symbol generated at the respective transmitter, wherein the channel symbols and perturbations are known to the receiver; receiving the transmitted signals at the receiver of the transmissions system; updating said weights of said transmitter algorithm, at the receiver, based on a loss function; providing (e.g. broadcasting) said updated weights to each transmitter of the transmission system; and repeating the receiving and updating until a first condition is reached.

In a seventh aspect, this specification describes an apparatus configured to perform (at least) any method as described with reference to the fourth, fifth or sixth aspects.

In an eighth aspect, this specification describes computer-readable instructions which, when executed by computing apparatus, cause the computing apparatus to perform (at least) any method as described with reference to the fourth, fifth or sixth aspects.

In a ninth aspect, this specification describes a computer-readable medium (such as a non-transitory computer-readable medium) comprising program instructions stored thereon for performing (at least) any method as described with reference to the fourth, fifth or sixth aspects.

In a tenth aspect, this specification describes an apparatus comprising: at least one processor; and at least one memory including computer program code which, when executed by the at least one processor, causes the apparatus to perform (at least) any method as described with reference to the fourth, fifth or sixth aspects.

In an eleventh aspect, this specification describes a computer program comprising instructions for causing an apparatus to perform at least the following: receiving, at a receiver of a transmissions system, transmitted signals from each of a plurality of transmitters, wherein each transmitter communicates with the receiver over one of a plurality of channels of the transmission system, wherein each transmitter includes a transmitter algorithm having at least some trainable weights, wherein each transmitter algorithm has the same trainable weights and wherein each of the transmitted signals is based on a perturbed channel symbol generated at the respective transmitter, wherein the channel symbols and perturbations are known to the receiver; updating said weights of said transmitter algorithm, at the receiver, based on a loss function; providing (e.g. broadcasting) said updated weights to each transmitter of the transmission system; and repeating the receiving and updating until a first condition is reached. The apparatus may be a receiver of a communication system (e.g. a central node, such as a base station, in communication with many transmitters, such as user devices). The receiver may include a receiver algorithm having at least some trainable weights. The loss function may be determined at the receiver based on a sum of losses for each of a plurality of symbols transmitted from the plurality of transmitters, based on the knowledge, at the receiver, of the respective channel symbols and the respective perturbations.

In a twelfth aspect, this specification describes a computer program comprising instructions for causing an apparatus to perform at least the following: transmitting signals from one of a plurality of transmitters of a transmission system to a receiver of the transmissions system, wherein each of the plurality of transmitters communicates with the receiver over one of a plurality of channels of the transmission system, wherein each transmitter includes a transmitter algorithm having at least some trainable weights, wherein each transmitter has the same trainable weights and wherein the transmitted signals are based on a perturbed channel symbol generated at the respective transmitter, wherein the channel symbols and perturbations are known to the receiver; and receiving updated weights of said transmitter algorithm from the receiver, wherein said weights are updated at the receiver based on a loss function. The apparatus may be one of a plurality of transmitters of a communication system (e.g. a mobile communication system).

In a thirteenth aspect, this specification describes an apparatus comprising: means (such as an input of a first processor) for receiving, at a receiver of a transmissions system, transmitted signals from each of a plurality of transmitters, wherein each transmitter communicates with the receiver over one of a plurality of channels of the transmission system, wherein each transmitter includes a transmitter algorithm having at least some trainable weights, wherein each transmitter algorithm has the same trainable weights and wherein each of the transmitted signals is based on a perturbed channel symbol generated at the respective transmitter, wherein the channel symbols and perturbations are known to the receiver; means (such as the first processor) for updating said weights of said transmitter algorithm, at the receiver, based on a loss function; means (such as an output of the first processor) for providing (e.g. broadcasting) said updated weights to each transmitter of the transmission system; and means (such as a control module) for repeating the receiving and updating until a first condition is reached.

In a fourteenth aspect, this specification describes an apparatus comprising: means (such as an output of a first processor) for transmitting signals from one of a plurality of transmitters of a transmission system to a receiver of the transmissions system, wherein each of the plurality of transmitters communicates with the receiver over one of a plurality of channels of the transmission system, wherein each transmitter includes a transmitter algorithm having at least some trainable weights, wherein each transmitter has the same trainable weights and wherein the transmitted signals are based on a perturbed channel symbol generated at the respective transmitter, wherein the channel symbols and perturbations are known to the receiver; and means (such as an input of the first processor) for receiving updated weights of said transmitter algorithm from the receiver, wherein said weights are updated at the receiver based on a loss function.

BRIEF DESCRIPTION OF THE DRAWINGS

Example embodiments will now be described, by way of non-limiting examples, with reference to the following schematic drawings.

DETAILED DESCRIPTION

Figure 1:
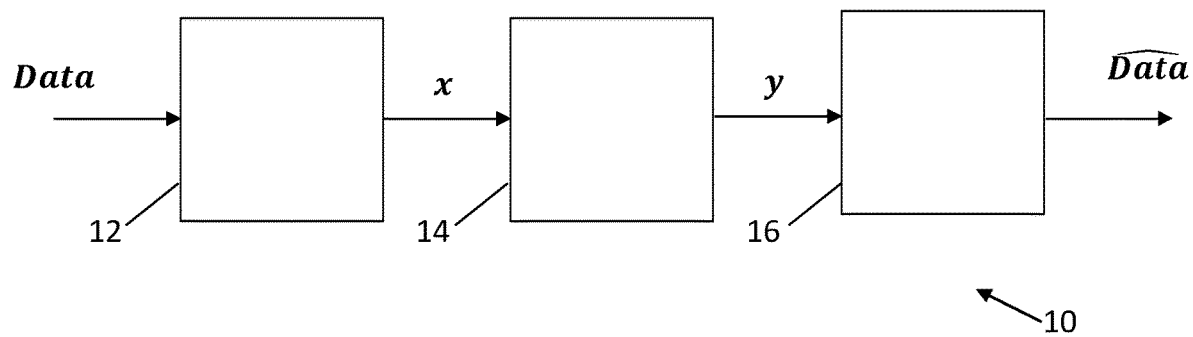
FIGS. 1 to 3 are block diagrams of an example end-to-end communication systems.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of an example end-to-end communication system, indicated generally by the reference numeral 10. The system 10 includes a transmitter 12, a channel 14 and a receiver 16. Viewed at a system level, the system 10 converts data received at the input to the transmitter 12 into transmit symbols (x) for transmission over the channel 14 and the receiver 16 generates an estimate of the transmitted data ($\widehat{data}$) from symbols (y) received from the channel 14.

The transmitter 12 may include a modulator that converts the data symbols into the transmit symbols (x) in accordance with a modulation scheme. The transmit symbols are then transmitted over the channel 14 and received at the receiver 16 as received symbols (y). The receiver may include a demodulator that converts the received symbols (y) into the estimate of the originally transmitted data symbols.

Figure 2:
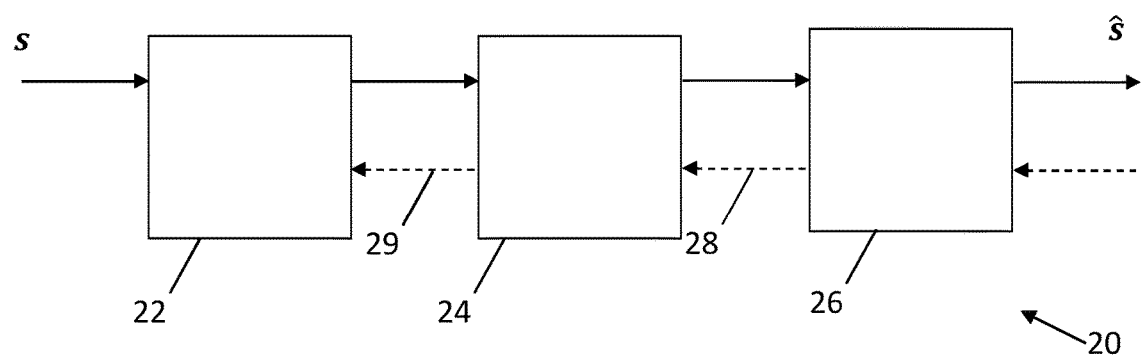

FIG. 2 is a block diagram of an example end-to-end communication system, indicated generally by the reference numeral 20. The system 20 includes a transmitter 22, a channel model 24 and a receiver 26 and is therefore similar to the system 10 described above.

The system 20 makes use of a neural network (NN)-based autoencoder. With this approach, the transmitter and receiver are implemented as neural networks and are jointly optimized for a specific performance metric and channel. The channel model 24 (which models the performance of the real channel used for communications between the transmitter 22 and the receiver 26) is a differentiable channel model such that the system 20 can be trained using backpropagation. More precisely, because a differentiable channel model is available, the channel model can be implemented as non-trainable layers between the transmitter 22 and the receiver 26, and the end-to-end system can be trained by backpropagating the gradients from the receiver to the transmitter, as indicated by the dotted arrows 28 and 29 in the system 20.

Figure 3:
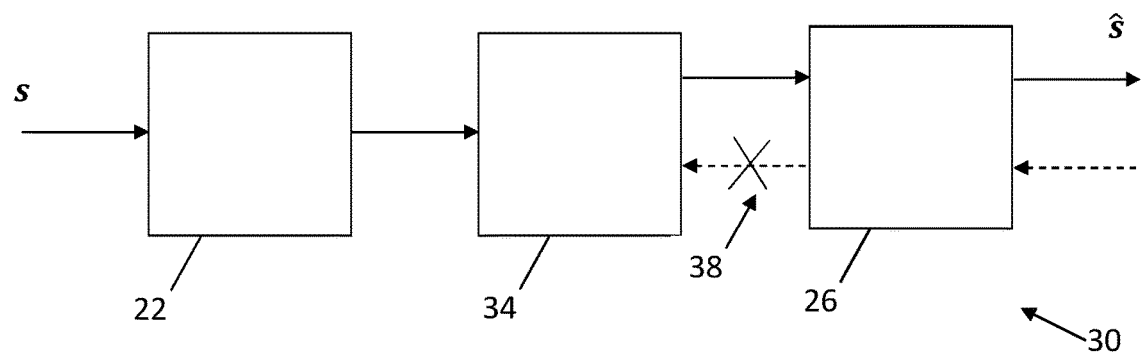

Training over the channel model 24 may lead to suboptimal performance due to a mismatch between the channel model and the performance of an actual channel used for transmission. To address this issue, training over the actual channel may be preferred. However, the actual channel is typically a "black box" which can only be sampled, preventing backpropagation of the gradients from the receiver to the transmitter By way of example, FIG. 3 is a block diagram of an example end-to-end communication system, indicated generally by the reference numeral 30. The system 30 comprises the transmitter 22 and the receiver 26 described above and further comprises the actual channel 34 used for transmissions between the transmitter and the receiver (rather than a channel model). As indicated generally by the crossed arrow 38, the use of the actual channel 34 prevents training of the system 30 as an autoencoder in the manner described above, since backpropagation through the channel 34 is not possible.

Figure 4:
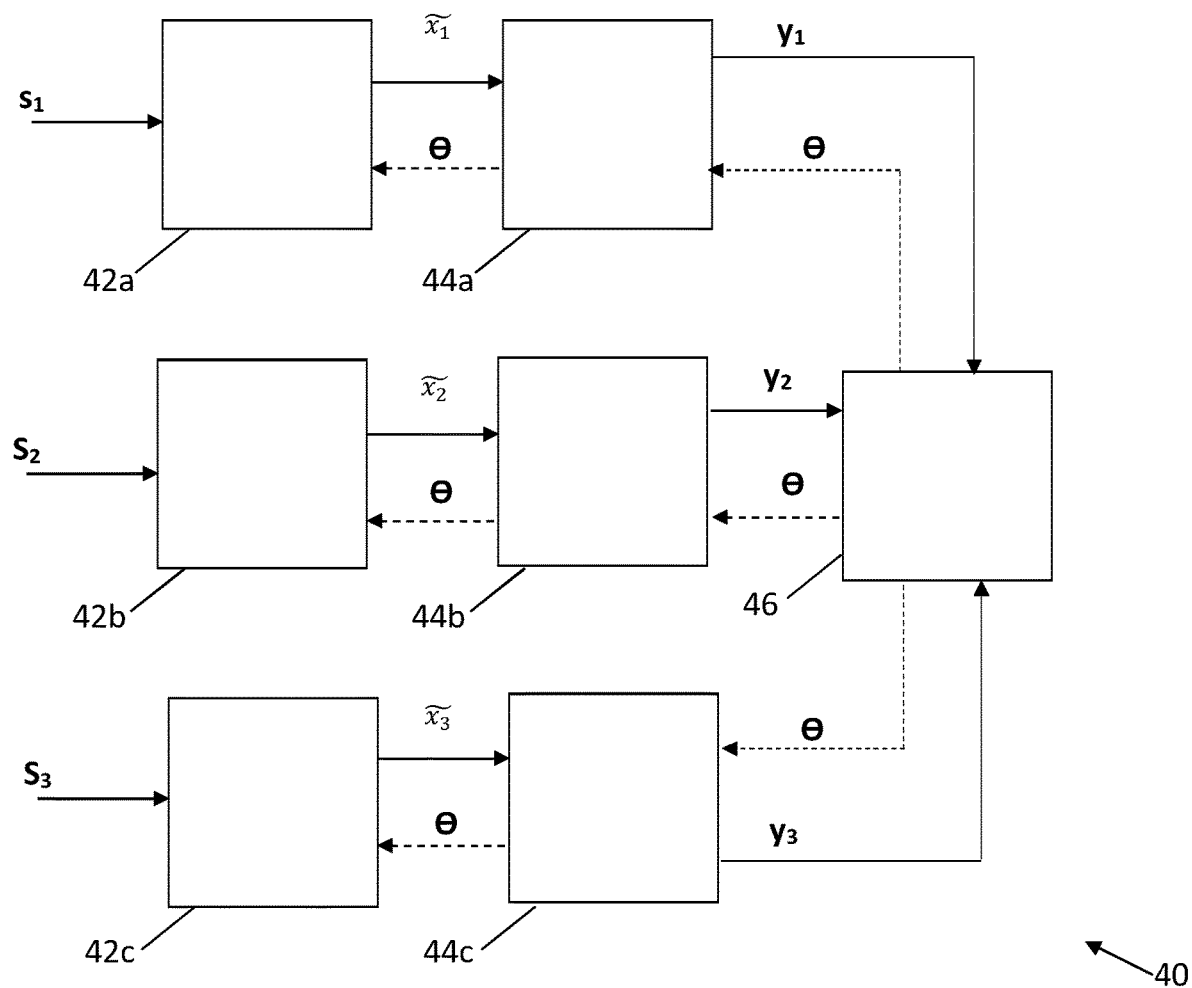
FIG. 4 is a block diagram of a communication system in accordance with an example embodiment.

FIG. 4 is a block diagram of a communication system, indicated generally by the reference numeral 40, in accordance with an example embodiment. The system 40 comprises a first transmitter 42a, a second transmitter 42b, a third transmitter 42c and a receiver 46. The first transmitter 42a is in two-way communications with the receiver 46 via a first channel 44a. Similarly, the second transmitter 42b is in two-way communications with the receiver 46 via a second channel 44b and the third transmitter 42c is in two-way communications with the receiver 46 via a third channel 44c.

In the system 40, each of the transmitters 42a, 42b and 42c has a set of a trainable parameters (e.g. neural network weights) denoted by θ that are shared by all the transmitters.

As indicated in FIG. 4, the first transmitter 42a converts data ($s_1$) received at the input to the transmitter into first transmit symbols ($\widetilde{x_1}$) for transmission over the first channel 44a and the receiver 46 receives first symbols ($y_1$) from the first channel 44a (and may, for example, generate an estimate of the transmitted data from the received symbols). Similarly, the second transmitter 42b converts data ($s_2$) received at the input to the transmitter into second transmit symbols ($\widetilde{x_2}$) for transmission over the second channel 44b and the receiver 46 receives second symbols ($y_2$) from the second channel 44b. The third transmitter 42c converts data ($s_3$) received at the input to the transmitter into third transmit symbols ($\widetilde{x_3}$) for transmission over the third channel 44c and the receiver 46 receives third symbols ($y_3$) from the third channel 44c.

As described further below, the trainable weights θ that are shared by all of the transmitters 42a, 42b and 42cs are updated at the receiver 46, based on a loss function. The updated weights are provided (e.g. broadcast) to each of the transmitters 42a, 42b and 42c, as indicated by the dotted lines in FIG. 4.

Figure 5:
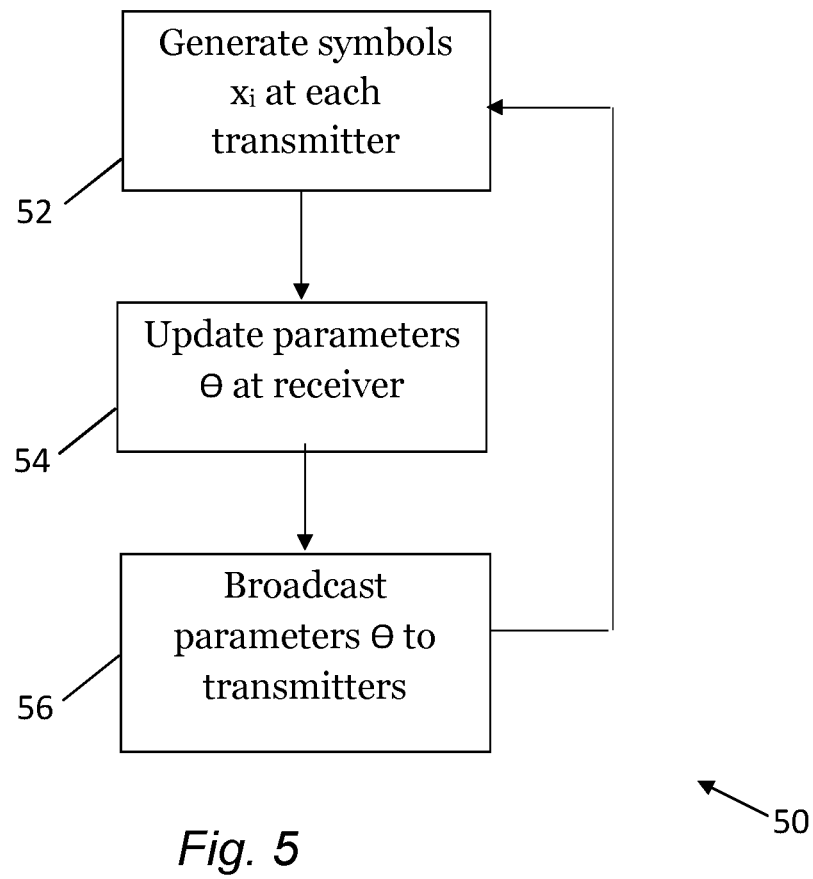
FIG. 5 is a flow chart showing an algorithm in accordance with an example embodiment.

FIG. 5 is a flow chart showing an algorithm, indicated generally by the reference numeral 50, in accordance with an example embodiment.

The algorithm 50 starts at operation 52, where each of the transmitters 42a, 42b and 42c generates symbols to be transmitted. Thus, the i-th transmitter generate messages $s_i$ which are mapped to channel symbols $x_i$ using the neural network within the respective transmitter. Each transmitter neural network implements the mapping denoted by $f_\theta$. The transmitters perturb the signals $x_i$ by adding small perturbations to it, denoted by $\epsilon_i$. Perturbations are added to enable approximation of the channel transfer function gradient. The messages $s_i$ as well as the perturbations $\epsilon_i$ are generated pseudo-randomly, e.g., using a pseudo-random number generator (PRNG) or according to predefined sequences. The perturbed signals $\widetilde{x_1}$ are transmitted over the channels 44a, 44b and 44c such that signals $y_i$ are received at the receiver 46.

At operation 54, the receiver 46 trains the set of weights θ shared by all the transmitters according to the received signals $y_i$ and using knowledge of the transmitted messages $s_i$ and perturbations $\epsilon_i$. This is possible assuming that at training, the messages and perturbations were generated by a PRNG with a seed that is known to the receiver or according to a predefined sequence.

At operation 56, the weights θ generated in the operation 54 are broadcast (or otherwise provided) to the transmitters.

The receiver 46 performs training of the transmitter weights based on samples from each of the transmitters of the communication system (such as the transmitters 42a, 42b and 42c described above), such that the optimization takes each of the respective channels in account (such as the channels 44a, 44b and 44c). Moreover, the computation of the updated parameters are carried out at the receiver (or under the control of the receiver), thereby simplifying the functionality of the transmitters (e.g. avoiding the requirement for specialized hardware at the transmitters, which could be user devices).

With this approach, the optimization process, which may require dedicated resources, would typically take place at the receiver (e.g. a base station), or in the core network (e.g. in the cloud). Optimization could be implemented based on a dataset consisting of samples from multiple receivers, avoiding overfitting to a particular link. When a user would connect to the base station or when its channel state would significantly change, it could receive the set of weights to use for transmitting from the base station.

Note that the channels described herein may include interference from other cells, making the systems described herein compatible with multi-cell systems.

Figure 6:
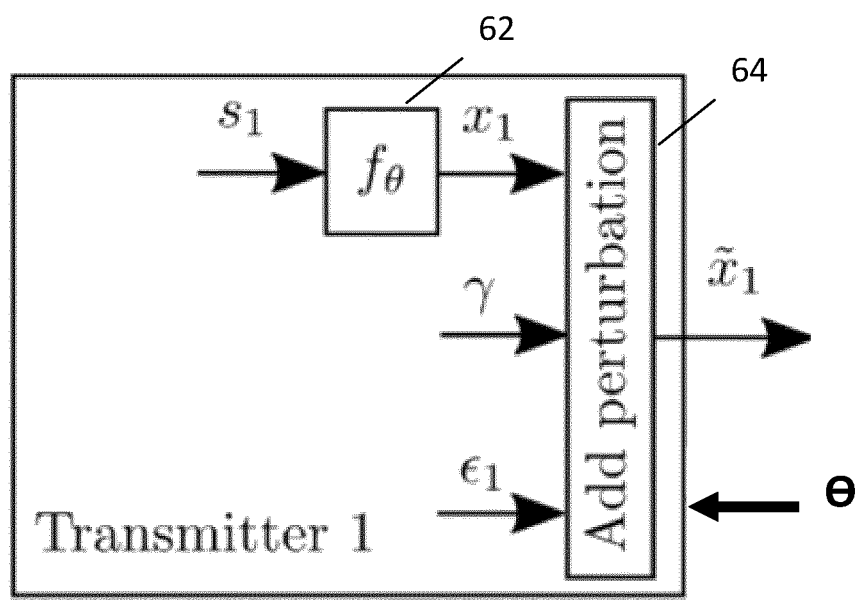
FIG. 6 is a block diagram of a transmitter in accordance with an example embodiment.

FIG. 6 is a block diagram of a transmitter, indicated generally by the reference numeral 60, in accordance with an example embodiment. The transmitter 60 is an example implementation of the first transmitter 42a described above. The second transmitter 42b and the third transmitter 42c may have the same structure.

The transmitter 60 comprises a first module 62 implementing the function $f_\theta$ and a second module 64. The first module 62 may comprise a neural network.

The first module 62 maps the messages $s_1$ onto the channel symbol $x_1$. The second module 64 adds perturbations $\epsilon_1$ to the channel symbol $x_1$ in accordance with a signal-to-perturbation ratio (SPR) denoted by γ to generate the output signal $\widetilde{x_1}$, (thereby implementing the operation 52 of the algorithm 50).

The transmitter 60 receives the weights θ discussed above. It should be noted that the function $f_\theta$ is typically a relatively small neural network, such that so that broadcasting of the weights θ does not incur prohibitive overhead. Moreover, it is broadcast to all transmitters participating in the training process, which allows for further savings of communication resources.

Figure 7:
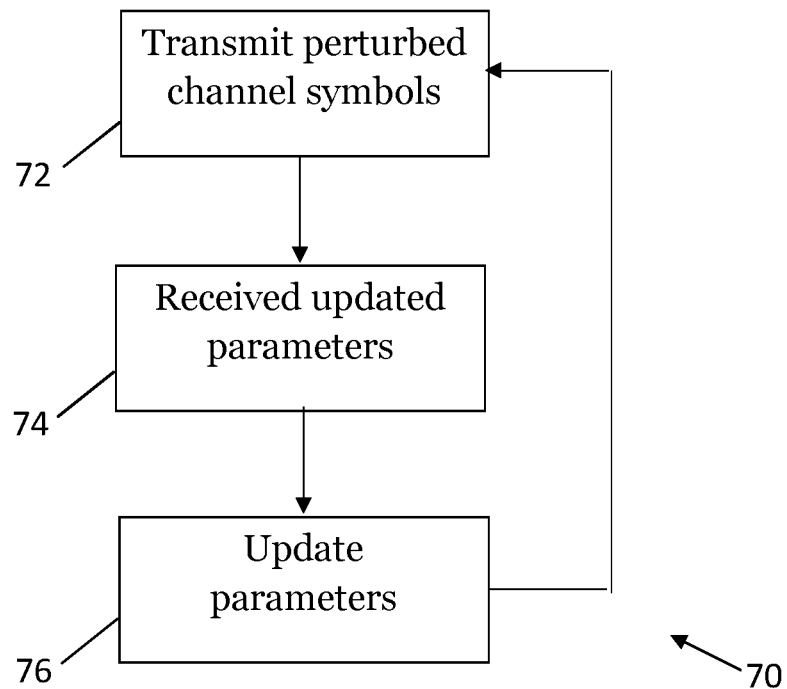
FIG. 7 is a flow chart showing an algorithm in accordance with an example embodiment.

FIG. 7 is a flow chart showing an algorithm, indicated generally by the reference numeral 70, in accordance with an example embodiment. The algorithm 70 may be implemented by the transmitter 60.

The algorithm 70 starts at operation 72 where the transmitter transmits perturbed channel symbols to a receiver, wherein the channel symbol and the perturbation to it are known to the receiver. As noted above, the channel symbols and/or said perturbations may be generated pseudo-randomly.

At operation 74, updated transmitter parameters are received from the receiver.

At operation 76, the transmitter parameters are updated based on the parameters received in the operation 74.

The algorithm 70 may then return to operation 72, such that the operations 72 to 76 are repeated. The operations 72 to 76 may, for example, be repeated a set number of time or until some other metric is achieved (e.g. a performance metric).

Figure 8:
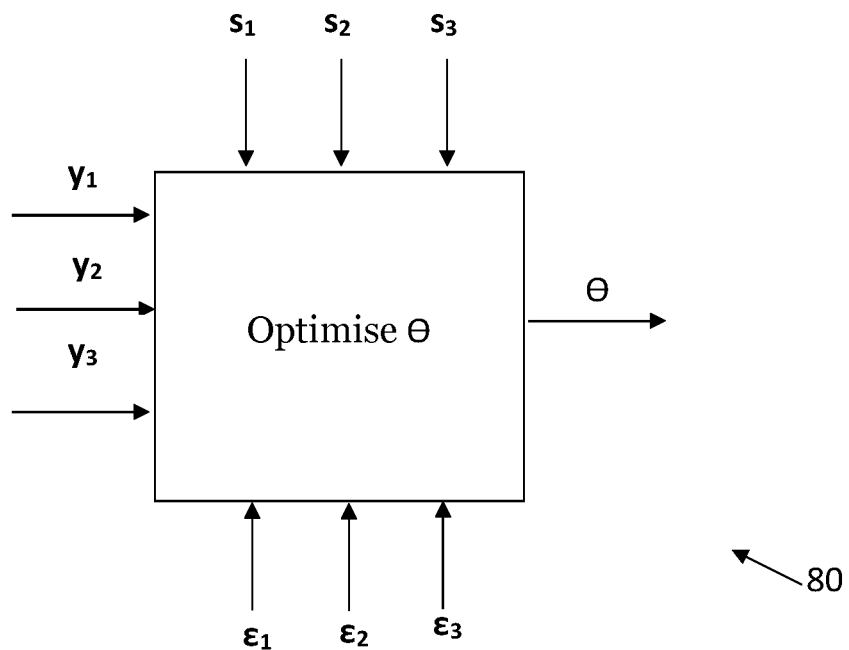
FIG. 8 is a block diagram of an optimisation module in accordance with an example embodiment.

FIG. 8 is a block diagram of an optimisation module, indicated generally by the reference numeral 80. The optimisation module 80 may form part of the receiver 46 of the system 40 described above. It is not essential to all example embodiments that the optimisation module 80 be provided at the receiver. For example, the optimisation module 80 may be provided at a central node, such as a base station, in communication with many transmitters, or may be provided elsewhere, but accessible by one or more transmitter.

The optimisation module 80 receives the first symbols ($y_1$) from the first channel 44a, the second symbols ($y_2$) from the second channel 44b and the third symbols ($y_3$) from the third channel 44c. The optimisation module 80 also receives the first messages $s_1$ and the first perturbations $\epsilon_1$ from which the first symbols are derived, the second messages $s_2$ and the second perturbations $\epsilon_2$ from which the second symbols are derived, and the third messages $s_3$ and the third perturbations $\epsilon_3$ from which the third symbols are derived. The various messages and perturbations may be generated locally at the optimisation module, for example using one or more pseudo-random number generators. As discussed further below, the optimisation module 80 generates the weights θ that are provided to the transmitters.

Figure 9:
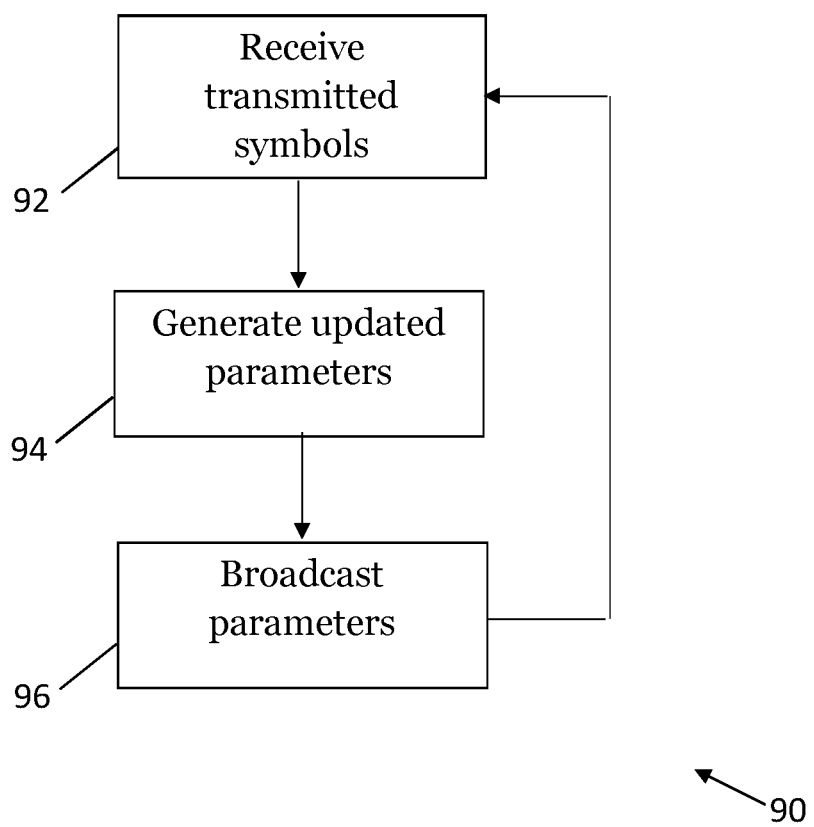
FIGS. 9 to 11 are flow charts showing algorithms in accordance with example embodiments.

FIG. 9 is a flow chart showing an algorithm, indicated generally by the reference numeral 90, in accordance with an example embodiment. The algorithm 90 may be implemented by the optimisation module 80.

The algorithm 90 starts at operation 92, where transmitted symbols are received. The transmitted symbols (e.g. as transmitted by the transmitters 42a, 42b and 42c) may be received at the receiver 46 of the transmission system 40. As discussed above, each transmitter includes a transmitter algorithm having at least some trainable weights, wherein each transmitter algorithm has the same trainable weights and wherein each of the transmitted signals is based on a perturbed channel symbol generated at the respective transmitter, wherein the channel symbols and perturbations are known to the receiver.

At operation 94, the transmitter parameters θ are updated, for example by the optimisation module 80 described above (which optimisation module may form part of the receiver 46). The transmitter parameter θ may be updated based on a loss function, as discussed further below.

At operation 96, the transmitter parameters are provided (e.g. broadcast) to each transmitter of the transmission system.

The operations 92 to 96 may be repeated until a first condition is reached (e.g. a defined number of repetitions or a defined performance metric).

Figure 10:
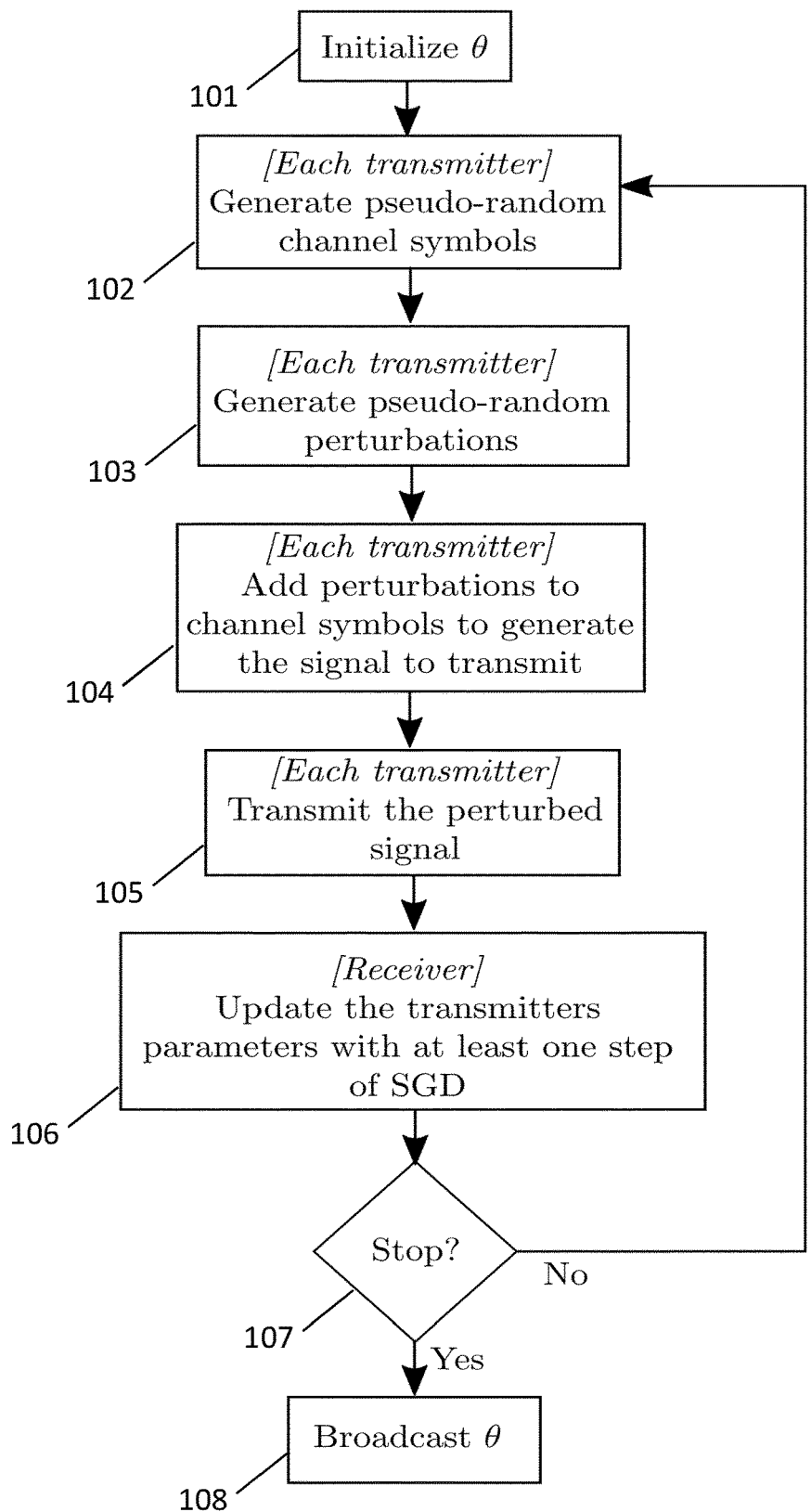

FIG. 10 is a flow chart showing an algorithm, indicated generally by the reference numeral 100, in accordance with an example embodiment. The algorithm 100 may be implemented using a plurality of transmitters 60, each in communication with the optimisation module 80 via a channel.

In the algorithm 100, let us denote by $N_T$ the number of transmitters (e.g. $N_T=3$ in the w communication system 40 described above). All transmitters implement the same algorithm with trainable parameters $$f_\theta: \mathcal{J} \to \mathbb{C}^n$$

where θ is the vector of trainable parameters, $\mathcal{J}$ the space of messages to be transmitted (e.g., bits), and n the number of complex channel uses per message.

The algorithm 100 starts at operation 101 where the parameters θ are initialised at the optimisation module 80. If all transmitters use the same initial value for θ, initialization could be, e.g., predefined or pseudo-random.

Initialising the parameters θ may comprise setting the parameters to a predefined starting point or to a random or pseudo-random starting point. Alternative implementation of the operation 101 will be apparent to those of ordinary skill in the art.

At operation 102, each transmitter $i \in \{1, \ldots, N_T\}$ generates a batch of size B of pseudo-random messages, e.g., using a PRNG or a predefined sequence. The B pseudo-random messages are denoted by $s_i \in \mathcal{J}^B$. Each message $s \in s_i$ is mapped to a complex channel symbol $x \in \mathbb{C}^n$ by the transmitter trainable algorithm $f_\theta$, and the resulting vector of stacked channel symbols is denoted by $x_i \in \mathbb{C}^{nB}$.

At operation 103, each transmitter $i \in \{1, \ldots, N_T\}$ generates a vector of pseudo-random perturbations $\epsilon_i \sim \mathcal{CN}(0, I_{nB})$, e.g., using a PRNG or a predefined sequence.

At operation 104, each transmitter $i \in \{1, \ldots, N_T\}$ generates the signal to be transmitted by perturbing the signal $x_i$ using the perturbation $\epsilon_i$ and according to a signal-to-perturbation ratio (SPR) denoted by $\gamma \in (0,1)$ $\tilde{x}_i = \sqrt{1-\gamma} x_i + \sqrt{\gamma} \epsilon_i$, where the scaling ensures the average energy constraint $\mathbb{E}\{|\tilde{x}_i|^2\}=1$, assuming $\mathbb{E}\{|x_i|^2\}=1$ and $\mathbb{E}\{|\epsilon_i|^2\}=1$.

At operation 105, each transmitter $i \in \{1, \ldots, N_T\}$ transmits the signal $\tilde{x}_i$.

At operation 106, the optimisation module (e.g. the receiver) receives the signals transmitted by the transmitters and altered by the channels, denoted by $y_i \in \mathbb{C}^{nB}$ for $i \in \{1, \ldots, N_T\}$. The optimisation module/receiver performs one step of stochastic gradient descent (SGD) on the loss function:

$$\mathcal{L}(\theta) \triangleq \frac{1}{N_T B} \sum_{i=1}^{B} \sum_{j=1}^{N_T} l(y_i^{(j)}, s_i^{(j)}) \frac{\left\| \tilde{x}_i^{(j)} - \sqrt{1-\gamma} f_\theta(s_i^{(j)}) \right\|^2}{\gamma}$$

where $l(\bullet,\bullet)$ is the per-example loss that depends on the application, $s_i^{(j)} \in \mathcal{J}$ is the $j^{th}$ transmitted message by $i^{th}$ user, $\tilde{x}_i^{(j)} \in \mathbb{C}^n$ is the perturbed output of the transmitter for the $i^{th}$ message of the $j^{th}$ user, i.e., $\tilde{x}_i^{(j)} = \sqrt{1-\gamma} x_i^{(j)} + \sqrt{\gamma} \epsilon_i^{(j)}$ where $x_i^{(j)} = f_\theta(s_i^{(j)})$, and $\epsilon_i^{(j)}$ is the pseudo-random perturbation, and $y_i^{(j)} \in \mathbb{C}^n$ is the received signal corresponding to $\tilde{x}_i^{(j)}$.

At operation 107, a determination is made regarding whether a stop criterion has been reached. (The stop criterion may include one or more of a predetermined number of iterations, a defined performance metric or whether the loss function has not decreased for a predefined number of iterations.) If the stop criterion has been reached, the algorithm 100 proceeds to operation 108, where the trained parameters are broadcast to all transmitters. Otherwise, the algorithm returns to operation 102 such that the operations 102 to 107 are repeated.

The per-example loss function $l(\bullet,\bullet)$ referred to in the operation 106 could take many forms. For example, let us assume that the transmitted messages are vector of bits of size m, i.e., $s \in \{0,1\}^m$ (i.e., $\mathcal{J}=\{0,1\}^m$). (Note that we dropped the user subscript i for readability.) Then the receiver will first compute probabilities over the transmitted bits from the received signal y, i.e., $p(s_k|y)$, where $s_k$, $k \in \{1, \ldots, m\}$, denotes the $k^{th}$ bit of s. In this case, the per example loss function may be the total binary cross-entropy:

$$l(y, s) = \sum_{k=1}^{m} (s_k \log(p(s_k=1|y)) + (1-s_k) s_k \log(p(s_k=0|y)))$$

Note that performing SGD on the loss function in the operation 106 does not require any knowledge of a channel model. Moreover, this loss is computed over all the users, meaning that the transmitters set of weights θ is optimized considering all users and channels.

Also, the computationally expensive SGD step performed in the operation 106 is carried at the receiver side, removing the need for computationally expensive computations at the transmitters.

A number of variants to the algorithm 100 are possible. For example, in some example embodiments, after computing the gradient at the receiver (in the operation 106), the gradients could be broadcasted to the transmitters (rather than the parameters themselves). The transmitters could then update the weights by applying the gradients to the weights. Moreover, in some example embodiments only gradients with values above a predefined threshold may be broadcast to reduce the amount of communication resources required.

In some implementations of the algorithm 100, one or more of the learning rate, batch size, and possibly other parameters of the SGD variant (Adam, RMSProp . . . ) may be optimization hyperparameters.

Assuming the receiver is implemented by an algorithm with trainable parameters (e.g., a neural network), it may be possible to optimize the receiver together with the transmitter (e.g. by joint optimization). As described below, an algorithm may be provided for training the trainable weights of a receiver algorithm having at least some trainable weights.

In the event that training of the receiver does not require backpropagating the gradient through the channel, no channel model is required to optimize the receiver. Joint training of the transmitter and receiver could therefore be achieved by alternating between conventional SL-based training of the receiver, and training of the transmitter using the previously depicted algorithm.

Figure 11:
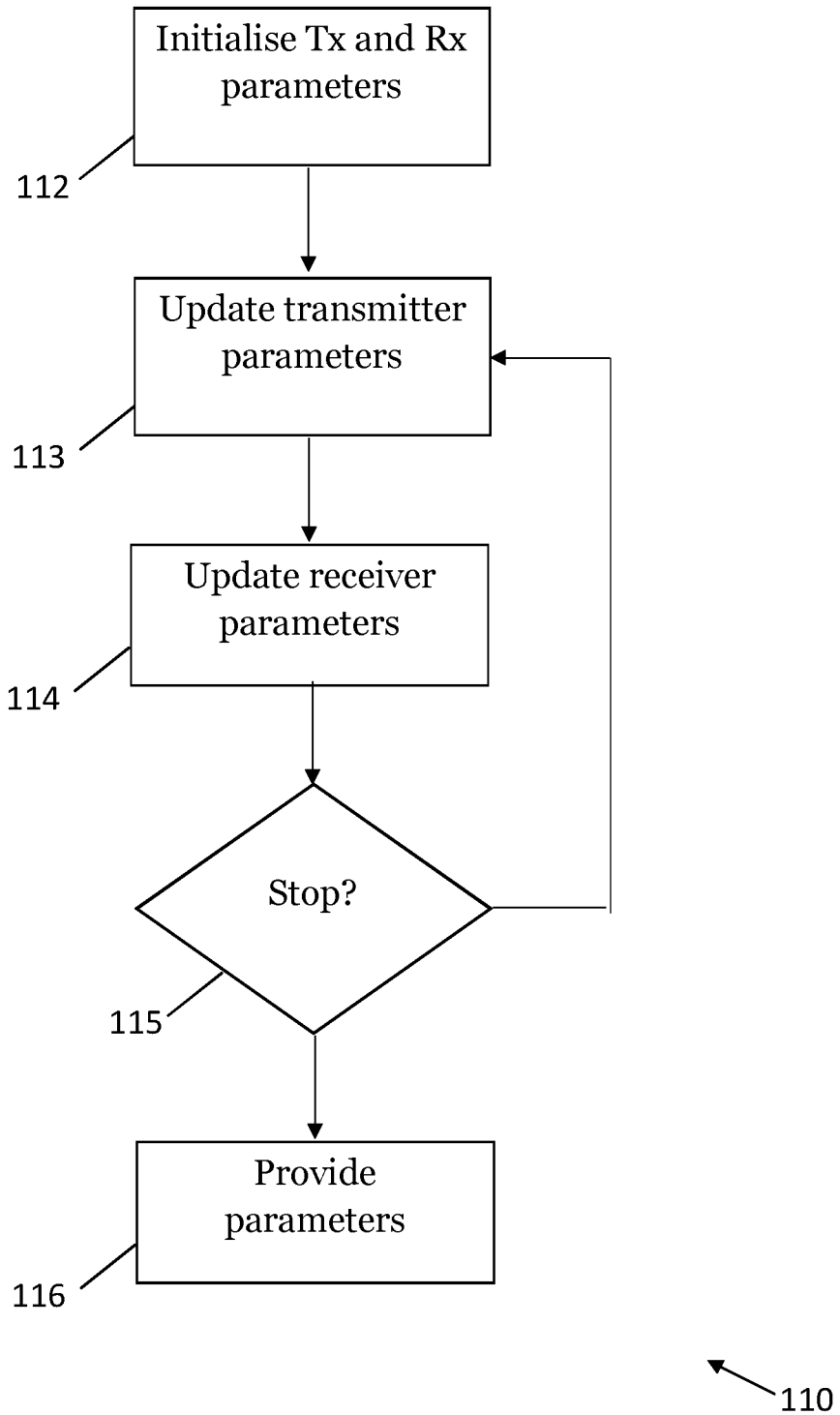

FIG. 11 is a flow chart showing an algorithm, indicated generally by the reference numeral 110, in accordance with an example embodiment.

Let us denote by $g_\psi$ the function implemented by the receiver where $\psi$ is the vector of trainable parameters. Then, joint training of the transmitters $f_\theta$ and receiver $g_\psi$ may be implemented as set out below.

At operation 112, the trainable parameters for the receiver $\psi$ and the transmitter $\theta$ are initialised. Initialization could be, e.g., predefined or pseudo-random.

At operation 113, the parameters from the transmitters are updated (for example by implementation instances of the operations 102 to 107 of the algorithm 100 described above).

At operation 114, the parameters of the receiver are updated. An example implementation of the operation 114 is provided below.

At operation a determination is made regarding whether a stop criterion has been reached. Similar criterion may be used to those discussed above with respect to the algorithm 100. If the stop criterion has been reached, the parameters are provided (e.g. broadcast) and the algorithm no terminates. If the stop criterion has not been reached, the algorithm returns to the operation 113.

The operation 114 may be implemented by performing one or more steps of receiver training as follows:

Each transmitter i∈ {1, . . . , $N_T$} generates a batch of size B of pseudo-random messages, e.g., using a PRNG or a predefined sequence. The B pseudo-random messages are denoted by $s_i \in \mathcal{J}^B$. Each message s∈ $s_i$ is mapped to a complex channel symbol x∈ $\mathbb{C}^n$ by the transmitter trainable algorithm $f_\theta$, and the resulting vector of stacked channel symbols is denoted by $x_i \in \mathbb{C}^{nB}$.

Each transmitter i∈ {1, . . . , $N_T$} transmits the signal $x_i$.

The receiver receives the signals transmitted by the transmitters and altered by the channels, denoted by $y_i \in \mathbb{C}^{nB}$ for i∈ {1, . . . , $N_T$}.

The receiver performs one step of SGD on the loss function:

$$\mathcal{J}(\psi) \triangleq \frac{1}{N_T B} \sum_{i=1}^{B} \sum_{j=1}^{N_T} l(g_\psi(y_i^{(j)}), s_i^{(j)})$$

Of course, many variants of the algorithm 110 that combine transmitter and receiver parameter training will be readily apparent to those of ordinary skill in the art.

A possible use of the concepts described herein is periodic or event-triggered online training of the transmitters (and, possibly, of the receiver). In such cases, the training procedures discussed above may be executed periodically or following the triggering of some event, e.g., when the communication rate has significantly deteriorated. In such cases, one could reuse samples (y, s, x) from previous trainings to reduce the number of transmissions required by the training procedure (e.g. the operations 102 to 106 of the algorithm 100 or the operations 113 and/or 114 of the algorithm 110). This may be achieved by storing newly observed samples in a replay memory for use at future training instances. For example, samples used to compute the loss function could be randomly sampled from the replay memory, and therefore would possibly include samples gathered during previous trainings, and not only freshly received samples. Not relevant samples could be discarded from the replay memory according to some policy, e.g., remove the oldest samples when new samples are received. In addition to reducing the number of samples required from the transmitters at each training, this approach may also introduce time diversity in the training process, by considering the channels over a longer time window. This may avoid overfitting to the current states of the channels.

The operation 108 of the algorithm 100 describes above includes broadcasting the set of weights θ to transmitters. This can be prohibitive if this set is too large. An alternative approved is to add a compression constraint to the loss function at the operation 106 of the algorithm 100. As an example, a L1 constraint could be added to enforce sparsity of the weights.

Figure 12:
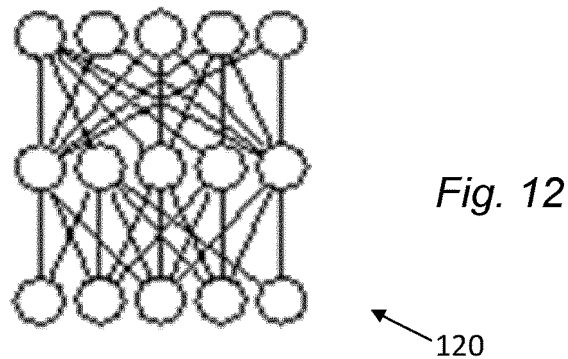
FIG. 12 shows an example neural network that may be used in one or more example embodiments.

Neural network technology may be used in a number of implementations described herein. FIG. 12 shows an example neural network 120 that may be used in one or more example embodiments. The neural network 120 comprises a plurality of interconnected nodes arranged in a plurality of layers. A neural network, such as the network 120, can be trained by adjusting the connections between nodes and the relative weights of those connections. As noted above, the transmitter and receiver algorithms may be implemented using one of more neural networks, such as a neural network having the form of the neural network 120.

Figure 13:
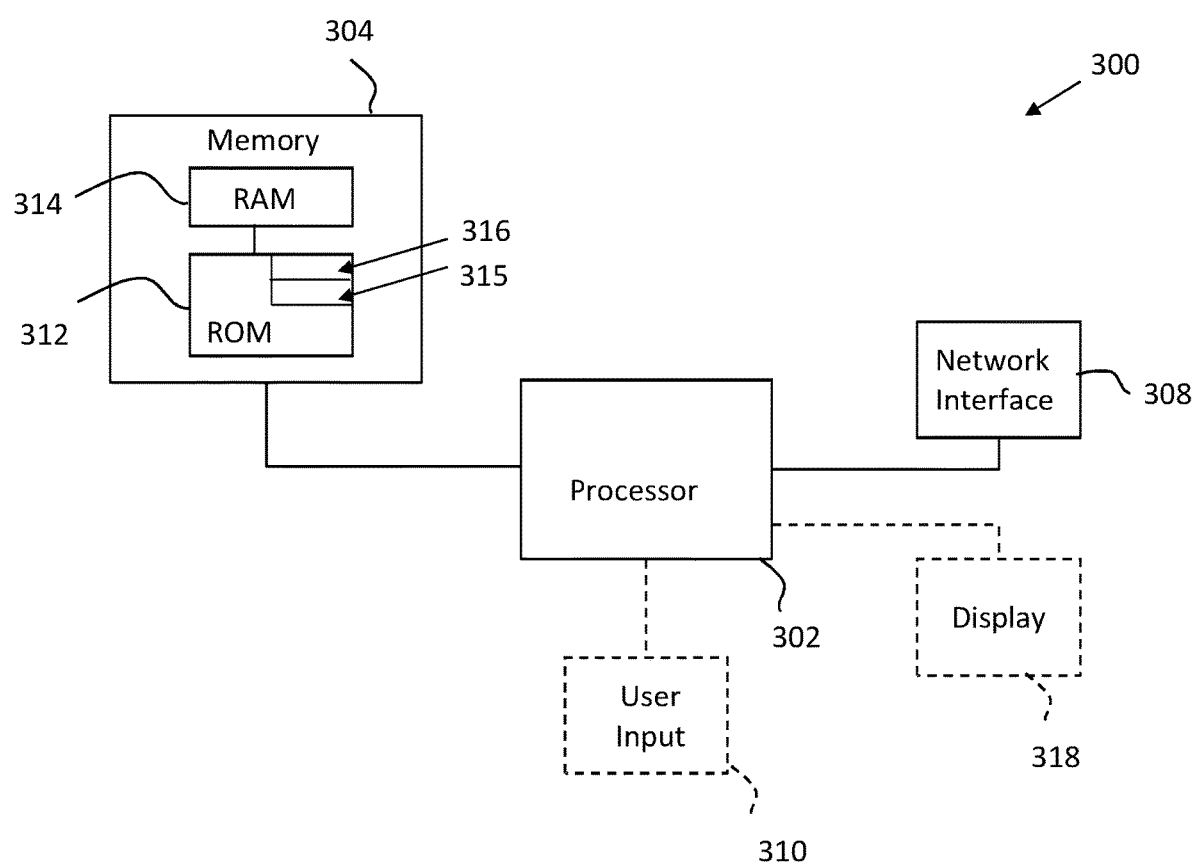
FIG. 13 is a block diagram of components of a system in accordance with an example embodiment.

For completeness, FIG. 13 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 50, 70, 90, 100, and 110 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 14A:
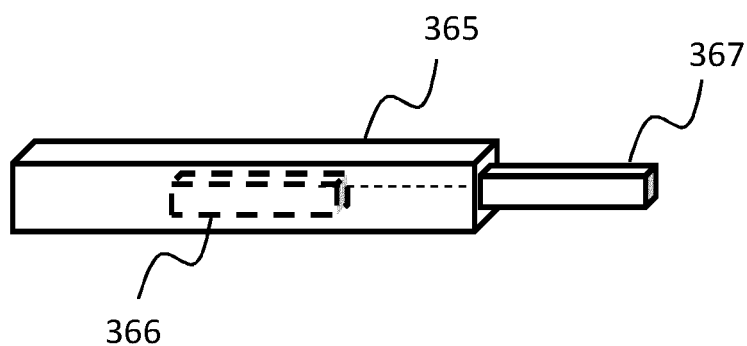
FIGS. 14A and 14B show tangible media, respectively a removable non-volatile memory unit and a company disc (CD) storing computer-readable code which when run by a computer perform operations according to example embodiment.
Figure 14B:
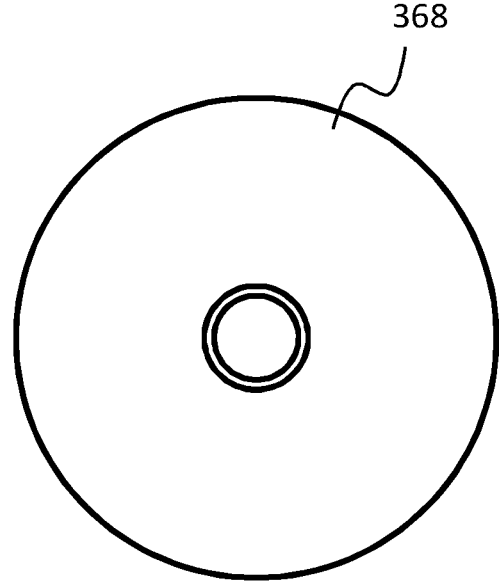

FIGS. 14A and 14B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 5, 7 and 9 to 11 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
at least one processor; and
at least one non-transitory memory storing instructions that, when executed with the at least one processor, cause the apparatus to perform:
receiving, at a receiver of a transmissions system, transmitted signals from a plurality of transmitters, wherein the transmitter communicates with the receiver over one of a plurality of channels of the transmission system, wherein the transmitter includes a transmitter algorithm having at least some trainable weights, wherein the transmitter algorithm has the same trainable weights and wherein the transmitted signals are based on a perturbed channel symbol generated at the respective transmitter, wherein the channel symbols and perturbations are known to the receiver;
updating said weights of said transmitter algorithm, at the receiver, based on a loss function;
providing said updated weights to the transmitter of the transmission system; and
repeating the receiving and updating until a first condition is reached.

2. An apparatus as claimed in claim 1, wherein the loss function is determined at the receiver based on a sum of losses for a plurality of symbols transmitted from the plurality of transmitters, based on the knowledge, at the receiver, of the respective channel symbols and the respective perturbations.

3. An apparatus as claimed in claim 1, wherein the receiver includes a receiver algorithm having at least some trainable weights.

4. An apparatus as claimed in claim 3, wherein the instructions, when executed with the at least one processor, cause the apparatus to perform: training the at least some trainable weights of the receiver algorithm.

5. An apparatus as claimed in claim 1, wherein the first condition comprises a defined number of iterations.

6. An apparatus comprising:
at least one processor; and
at least one non-transitory memory storing instructions that, when executed with the at least one processor, cause the apparatus to perform:
transmitting signals from one of a plurality of transmitters of a transmission system to a receiver of the transmissions system, wherein the plurality of transmitters communicates with the receiver over one of a plurality of channels of the transmission system, wherein the transmitter includes a transmitter algorithm having at least some trainable weights, wherein the transmitter has the same trainable weights and wherein the transmitted signals are based on a perturbed channel symbol generated at the respective transmitter, wherein the channel symbols and perturbations are known to the receiver; and
receiving updated weights of said transmitter algorithm from the receiver, wherein said weights are updated at the receiver based on a loss function.

7. An apparatus as claimed in claim 1, wherein at least one of the channel symbols or the perturbations are generated pseudo-randomly.

8. An apparatus as claimed in claim 1, wherein the instructions, when executed with the at least one processor, cause the apparatus to perform: initialising said trainable weights of said transmitter algorithm.

9. An apparatus as claimed in claim 1, wherein the receiver is a communication node of a mobile communication system.

10. An apparatus as claimed in claim 1, wherein said transmitter algorithm is implemented using neural networks.

11. An apparatus, comprising:
at least one processor; and
at least one non-transitory memory storing instructions that, when executed with the at least one processor, cause the apparatus to perform:
transmitting signals from one or more of the plurality of transmitters to the receiver, wherein the plurality of transmitters communicates with the receiver over one of the plurality of channels, wherein the transmitter includes a transmitter algorithm including transmitter parameters having at least some trainable weights, wherein the transmitter has the same trainable weights and wherein the transmitted signals are based on a perturbed channel symbol generated at the respective transmitter, wherein the channel symbols and perturbations are known to the receiver;
receiving the transmitted signals at the receiver of the transmissions system;
updating said weights of said transmitter algorithm, at the receiver, based on a loss function;
providing said updated weights to the transmitter of the transmission system; and
repeating the receiving and updating until a first condition is reached.

12. A method comprising:
receiving, at a receiver of a transmissions system, transmitted signals from a plurality of transmitters, wherein the transmitter communicates with the receiver over one of a plurality of channels of the transmission system, wherein the transmitter includes a transmitter algorithm having at least some trainable weights, wherein the transmitter algorithm has the same trainable weights and wherein the transmitted signals are based on a perturbed channel symbol generated at the respective transmitter, wherein the channel symbols and perturbations are known to the receiver;
updating said weights of said transmitter algorithm, at the receiver, based on a loss function;
providing said updated weights to the transmitter of the transmission system; and
repeating the receiving and updating until a first condition is reached.

13. A non-transitory program storage device readable by an apparatus, tangibly embodying a program of instructions executable with the apparatus for performing operations of claim 12.

14. A method comprising:
transmitting signals from one of a plurality of transmitters of a transmission system to a receiver of the transmissions system, wherein the plurality of transmitters communicates with the receiver over one of a plurality of channels of the transmission system, wherein the transmitter includes a transmitter algorithm having at least some trainable weights, wherein the transmitter has the same trainable weights and wherein the transmitted signals are based on a perturbed channel symbol generated at the respective transmitter, wherein the channel symbols and perturbations are known to the receiver; and
receiving updated weights of said transmitter algorithm from the receiver, wherein said weights are updated at the receiver based on a loss function.

15. A non-transitory program storage device readable by an apparatus, tangibly embodying a program of instructions executable with the apparatus for performing operations of claim 14.

* * * * *